United States Patent
Blackwood et al.

(10) Patent No.: US 8,403,427 B2
(45) Date of Patent: Mar. 26, 2013

(54) VEHICLE AIR SUPPLY SYSTEM

(75) Inventors: Andrew G. L. Blackwood, Shipley (GB); Ignitius Milomo, Bradford (GB)

(73) Assignee: Wabco Automotive UK Limited, Morley, Leeds (GB)

( * ) Notice: Subject to any disclaimer, the term of this patent is extended or adjusted under 35 U.S.C. 154(b) by 1541 days.

(21) Appl. No.: 10/517,834

(22) PCT Filed: Jul. 2, 2003

(86) PCT No.: PCT/GB03/02827
§ 371 (c)(1),
(2), (4) Date: Jul. 20, 2005

(87) PCT Pub. No.: WO2004/005100
PCT Pub. Date: Jan. 15, 2004

(65) Prior Publication Data
US 2005/0258680 A1   Nov. 24, 2005

(30) Foreign Application Priority Data
Jul. 3, 2002   (GB) .................................. 0215421.9

(51) Int. Cl.
*B60T 17/00* (2006.01)
(52) U.S. Cl. ................................. 303/1; 303/2
(58) Field of Classification Search ................. 303/1, 2; 34/562, 563, 80, 330; 454/156
See application file for complete search history.

(56) References Cited

U.S. PATENT DOCUMENTS

| | | | | |
|---|---|---|---|---|
| 4,714,483 A | * | 12/1987 | Koening et al. | 96/113 |
| 4,892,569 A | * | 1/1990 | Kojima | 96/113 |
| 4,936,026 A | * | 6/1990 | Cramer et al. | 34/562 |
| 5,027,529 A | * | 7/1991 | Cramer et al. | 34/562 |
| 5,592,754 A | * | 1/1997 | Krieder et al. | 34/527 |
| 5,917,139 A | * | 6/1999 | Goodell et al. | 96/113 |
| 6,074,462 A | * | 6/2000 | Quinn et al. | 96/113 |
| 6,120,107 A | * | 9/2000 | Eslinger | 303/1 |
| 6,640,463 B1 | * | 11/2003 | Beck et al. | 34/527 |

FOREIGN PATENT DOCUMENTS

| | | |
|---|---|---|
| WO | WO 91/16224 | 10/1991 |
| WO | WO 91/16225 | 10/1991 |
| WO | WO 94/07726 | 4/1994 |
| WO | WO01/17834 * | 3/2001 |
| WO | WO 01/17834 A1 | 3/2001 |

OTHER PUBLICATIONS

Oct. 21, 2003 International Search Report for International Application No. PCT/GB 03/02827.

* cited by examiner

*Primary Examiner* — Bradley King
*Assistant Examiner* — Mahbubur Rashid
(74) *Attorney, Agent, or Firm* — Nixon Peabody LLP; Jeffrey L. Costellia

(57) ABSTRACT

The invention relates to a vehicle air supply system adaptable to occasionally supply large volumes of air at relatively low pressure for purposes such as tire inflation. The system has a compressor, an air dryer, a reservoir adapted to receive air from the compressor via the air dryer, and a controller operable to cause a standard regeneration of the air dryer when a predetermined system condition is met. The controller is also operable to cause an intermediate regeneration of the air dryer in advance of the predetermined system condition being met. The controller is further operable to inhibit the intermediate regeneration. The controller is operable so as to prevent saturation of an air dryer desiccant in circumstances where the compressor is on load for an extended period of time and likely to be pumping a large volume.

10 Claims, 1 Drawing Sheet

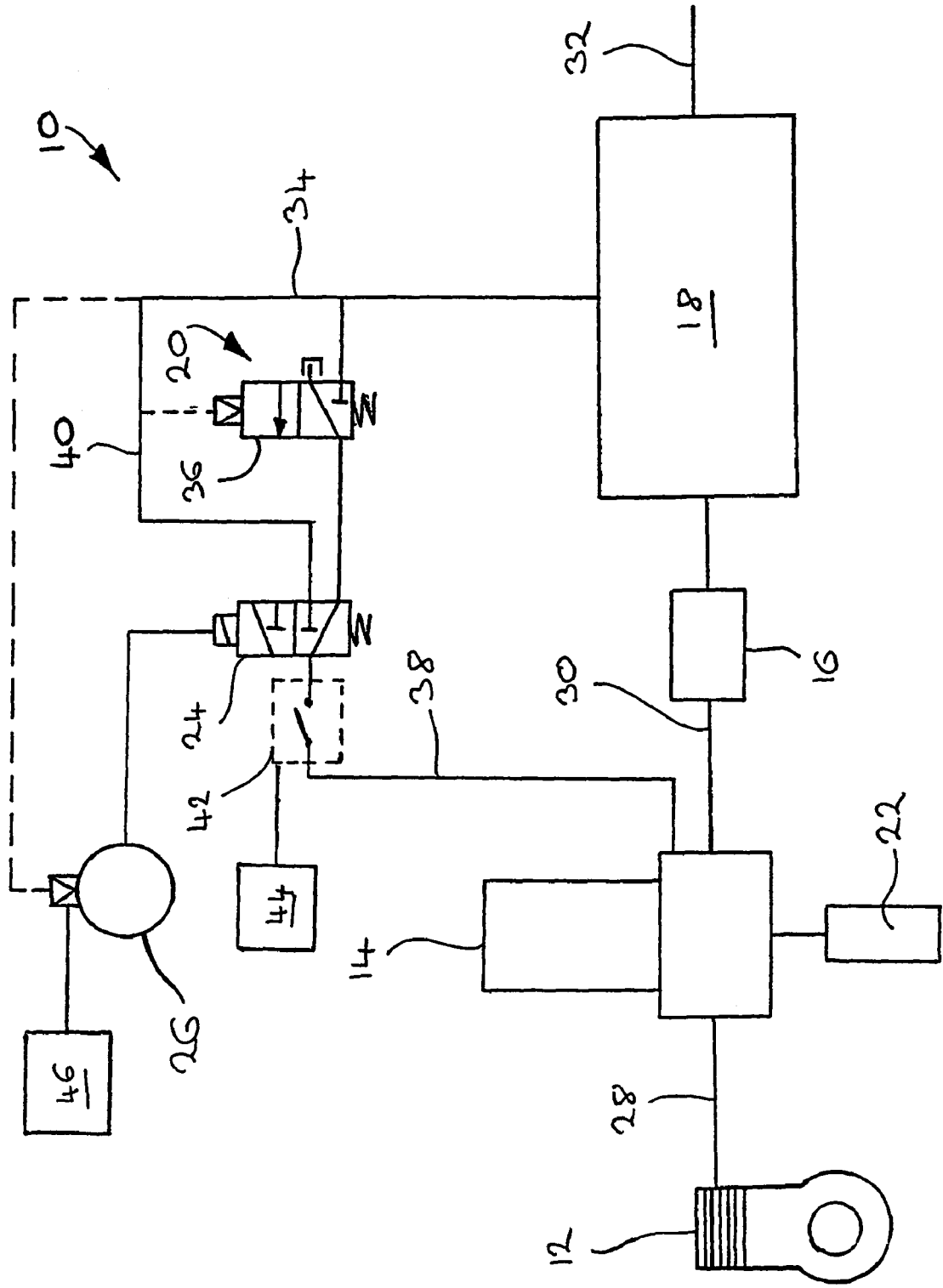

VEHICLE AIR SUPPLY SYSTEM

This invention relates to a vehicle air supply system and particularly to a system adaptable to occasionally supply large volumes of air at relatively low pressure for, for example, tyre inflation purposes.

A typical air supply system includes a compressor, a reservoir for pressurised air, and a driver operated demand valve to forward air from the reservoir for a desired purpose, for example to operate and maintain a braking system or pneumatic suspension system. The air supply system usually includes a dryer for compressor outlet air, and control means to take the compressor off load and regenerate the air dryer when the reservoir is at maximum pressure and the demand valve is closed. The compressor is typically taken off load by spragging a valve or by venting the compressor cylinder to atmosphere so that the compressor free wheels. Alternatively the compressor may include a clutch engageable with the compressor drive source, usually the vehicle engine. The air dryer is regenerated by passing a volume of dry air through the desiccant in reverse, and is typically triggered as the reservoir reaches maximum pressure, and regardless of the volume of air which has been dried.

In addition to the air being used e.g. for pneumatic suspension, the system may occasionally be required to forward relatively large volumes of air, i.e. volumes greater than the volume of the reservoir, at low pressure for, for example, tyre inflation. Typically the pressure of air required for tyre inflation will not exceed 2.5 bar. In such a situation the compressor is required to operate for longer than is normally required to fill the reservoir, and there exists the possibility that during this extended operation of the compressor the desiccant in the air dryer may become saturated especially if the air dryer is regenerated only at times when the reservoir reaches the maximum design pressure.

If however the air dryer is designed to cope with occasional demands for a large volume of air, the volume of desiccant will be very large, and the majority will be unused for most of the time. To address such an eventuality the control means may be configured so as effect intermediate regeneration of the desiccant, that is to say before the reservoir reaches maximum pressure. However, there may exist vehicle operation modes where such an intermediate regeneration is undesirable.

According to the present invention there is provided an air supply system having a compressor, an air dryer, a reservoir adapted to receive air from the compressor via the air dryer, and control means operable to cause a standard regeneration of the air dryer when a predetermined system condition is met, the control means also being operable to cause an intermediate regeneration of the air dryer in advance of said predetermined system condition being met, wherein the control means are further operable to inhibit said intermediate regeneration.

In a preferred embodiment the additional control means include a governor which is adapted to cause a standard regeneration and a governor bypass adapted to cause an intermediate regeneration. In order to inhibit the intermediate regeneration the control means may be adapted so as to disable the governor bypass.

The control means is operable so as to prevent saturation of the air dryer desiccant in circumstances where the compressor is on load for an extended period of time, and thus likely to be pumping a large volume.

In a preferred embodiment the predetermined system condition is a reservoir pressure and the governor is adapted to operate when the reservoir reaches a target pressure. In such an embodiment the governor sends an off load/purge signal to the compressor and air dryer when the target pressure is reached. The signal may be a pressure signal. Preferably the pressure signal is communicated via a pressure line from the reservoir. The governor may, in a preferred embodiment, include a pressure sensitive valve in said pressure line.

The control means may be adapted to bypass the governor and send an off load/purge signal to the compressor and air dryer. In the case where signal is a pressure signal, the control means may include a bypass line for the governor, a valve positioned in said bypass line and a timer adapted to open said valve. The valve may be solenoid operated. The timer is thus adapted to open said valve and thereby send an off-load purge signal after a predetermined time period has elapsed. Preferably the timer is activated and suspended response to a predetermined system condition. The timer may be responsive to, for example, reservoir pressure or the operating condition of the compressor. The timer is preferably reset after each regeneration.

In order to inhibit the intermediate regeneration there may be provided means to block or interrupt the signal to the compressor and air dryer. In the example of a pressure signal there may be provided means to block the pressure line. In an alternative embodiment the timer may be adaptable so as to prevent an intermediate regeneration. For example, the timer may be adapted so as to be suspended, or alternatively to increase the predetermined time period. In such an embodiment where the timer period is increased it will be understood that, as a result of such an increase, the desiccant may contain more moisture than would be expected to accumulate during normal use. The timer may therefore be adapted to reduce the time period between a predetermined number of regenerations subsequent to inhibiting a regeneration.

In yet a further embodiment the operation of the compressor may be modified after the occurrence of an inhibited regeneration in order to allow the desiccant to recover. The threshold pressure at which the compressor cuts out may be temporarily lowered, thereby permitting more regenerations to take place.

An embodiment of the present invention will now be described with reference to the accompanying drawing (FIG. 1) which shows a schematic representation of an air supply system, generally designated 10, according to the present invention.

The air supply system 10 includes a compressor 12, an air dryer 14, a charging valve 16 and a reservoir 18. The system 10 further includes a governor 20 which is sensitive to the pressure within the reservoir 18 and arranged to take the compressor off load and regenerate the air dryer desiccant when the reservoir 18 reaches a target pressure. Regeneration of the air dryer desiccant is achieved by venting the air dryer 14 to atmosphere and flushing the desiccant with a small amount of dry air contained in a purge tank 22. In FIG. 1 the purge tank 22 is shown separate from the reservoir 18, however it will be understood that the purge tank 22 can be incorporated into the reservoir 18. Finally, the air supply system 10 comprises a purge control valve 24 and a timer 26, the operation of which will be described in greater detail below.

Normal operation of the air supply system 10 is as follows. Moist compressed air from the compressor 12 is passed via conduit 28 to the air dryer 14. The moist air is dried by being passed through a desiccant bed in the air dryer 14 before being supplied to the reservoir 18 via conduit 30 and the charging valve 16, and to the reservoir 22. Pressurised air from the reservoir 18 can then be supplied via outlet conduit 32 and a demand valve (not shown). The reservoir 18 includes a pressure line 34 which is connected to the governor 20. In the embodiment shown the governor 20 includes a pressure sensitive valve 36 which is operable to supply a signal pressure via pressure line 38 from the reservoir 18 to the air dryer 14.

When the governor 20 senses via pressure line 34 that the reservoir 18 has reached a target pressure, the valve 36 moves from the position shown to pressurise line 38. The pressure signal received by the air dryer 14 takes the compressor 12 off load, opens a vent of the air dryer 14 to atmosphere and purges the desiccant with dry air from the purge tank 22. When the reservoir pressure falls below a predetermined pressure, for example when air is supplied from the reservoir 18, the valve 36 reverts to the position shown in the figure and the pressure signal to the air dryer 14 is cut off. The air dryer vent closes and the compressor 12 is brought on line to replenish the reservoirs 18, 22.

The rating of the compressor 12 and air dryer 14, and the volume of the reservoir 18 are such that during normal operation as described above, regeneration of the desiccant takes place well before saturation is reached. However in circumstances where the compressor 12 is required to supply volumes of air in excess of those normally required to replenish the reservoir 18, intermediate regeneration of the desiccant, i.e. before the reservoir target pressure is reached, is necessary to prevent saturation of the desiccant.

This intermediate regeneration is achieved by the provision of the timer 26 and purge control valve 24. The timer 26 is sensitive to the pressure in the reservoir 18 and when the reservoir pressure drops below a predetermined value the timer 26 is activated. After a predetermined time interval the timer 26 operates the purge control valve 24 via a solenoid and causes it to move form the position shown in the figure. This has the effect of pressurising line 38 via a governor bypass line 40 and pressure line 34. The pressure signal received by the air dyer 14 has the effect of taking the compressor 12 off load and purging the desiccant. When the purging operation has taken place, typically a few seconds, the valve 24 reverts to its initial position and the timer 26 is reset. The loss of pressure in line 38 brings the compressor 12 on load and the supply of pressurised air to the reservoir 18 resumed.

During normal operating conditions, the desiccant is regenerated by the governor 20 well in advance of the time interval required for the timer 26 to operate the purge control valve 24. In such circumstances, when the reservoir 18 reaches the target pressure and/or the governor 18 operates, the timer is suspended or reset in advance of the next drop in reservoir pressure. It will be understood that the timer governed purge cycle will repeat until the timer is suspended or reset.

In the embodiment shown the timer 26 is sensitive to and operated by the reservoir pressure. It will be understood that the timer 26 may be sensitive to other system parameters. For example the timer 26 may be activated when the compressor comes on load and be suspended/reset when the compressor comes off load.

As discussed above, the system 10 may be controlled so as to inhibit the intermediate regeneration of the air dryer 14. In one embodiment there is provided means 42 adapted to break the pressure line 38 and associated control means 44. In an alternative embodiment control means 46 may be provided which alter the operation of the timer 26. For example the timer 26 may be suspended when it is determined that an intermediate regeneration is to be inhibited. Alternatively, the control means 46 may increase the time period which needs to elapse before an intermediate regeneration.

The invention claimed is:

1. A vehicle air supply system having a compressor, an air dryer, a reservoir adapted to receive air from the compressor via the air dryer, and control means operable to cause a standard regeneration of the air dryer when a predetermined system condition is met, the control means also being operable to cause an intermediate regeneration of the air dryer in advance of said predetermined system condition being met if said system condition is not met within a predetermined time period, the control means further being operable to prevent the intermediate regeneration, wherein the control means includes a governor adapted to cause the standard regeneration and a governor bypass adapted to cause the intermediate regeneration, the control means being adapted so as to disable the governor bypass to prevent the intermediate regeneration, wherein the control means includes a timer, wherein the control means is operable to selectively cause and prevent the intermediate regeneration depending upon air supply requirements.

2. An air supply system as claimed in claim 1, wherein the predetermined system condition is a reservoir pressure and the governor is adapted to operate when the reservoir reaches a target pressure.

3. An air supply system as claimed in claim 2, wherein the governor sends an off load/purge signal to the compressor and air dryer when the target pressure is reached.

4. An air supply system as claimed in claim 3, wherein the signal is a pressure signal.

5. An air supply system as claimed in claim 1, wherein the control means is adapted to bypass the governor and send an offload/purge signal to the compressor and air dryer.

6. An air supply system as claimed in claim 5, wherein the control means further includes a bypass line for the governor and a valve positioned in said bypass line, and the timer is adapted to open said valve.

7. An air supply system as claimed in claim 6, wherein the valve is solenoid operated.

8. An air supply system according to any preceding claim, wherein the timer is activated and suspended in response to a predetermined system condition.

9. An air supply system as claimed in claim 5, wherein there is provided means to block the signal to the compressor and air dryer so as to inhibit the intermediate regeneration.

10. An air supply system according to any preceding claim, wherein the timer is operable to reduce the time period between subsequent regenerations after inhibiting an intermediate regeneration.

* * * * *